United States Patent [19]

Woodruff

[11] Patent Number: 5,032,005
[45] Date of Patent: Jul. 16, 1991

[54] HIGH SPEED SHUTTER MECHANISM FOR A LIGHT BEAM

[75] Inventor: David C. Woodruff, Mountain View, Calif.

[73] Assignee: NM Laser Products, Inc., Sunnyvale, Calif.

[21] Appl. No.: 513,681

[22] Filed: Apr. 24, 1990

[51] Int. Cl.⁵ .............................................. G02B 26/02
[52] U.S. Cl. ................................. 350/269; 250/498.1
[58] Field of Search ............... 350/266, 269, 270, 486, 350/487; 250/229, 498.1

[56] References Cited

U.S. PATENT DOCUMENTS

| | | | |
|---|---|---|---|
| 4,082,435 | 4/1978 | Zeitz | 350/269 |
| 4,170,731 | 10/1979 | Howell et al. | 350/266 |
| 4,332,450 | 6/1982 | Griffith | 354/234.1 |
| 4,415,231 | 11/1983 | Kaczeusky et al. | 350/269 |
| 4,799,767 | 1/1989 | Woodruff | 350/269 |
| 4,946,256 | 8/1990 | Woodruff | 350/269 |

Primary Examiner—Paul M. Dzierzynski
Assistant Examiner—James Phan
Attorney, Agent, or Firm—Schneck & McHugh

[57] ABSTRACT

A high speed beam shutter having a flat, flexible, reflective ferromagnetic blade oriented with a lengthwise direction of the blade at approximately a right angle to the beam path and tilted up in the widthwise direction so as to be oriented at approximately 45° to the beam path to reflect the beam downward to a light trap. The blade intersects the light path in either its straight or flexed position, but not both, and is flexed by means of an electromagnet. The electromagnet has an elongated core with J-shaped cross-section with the J-arm and J-hook ends defining magnetic poles. The blade, electromagnet and light trap may be housed in a case with side apertures defining the beam path. Both conductive and water cooling of the blade with a beam stop, and cooling of the light trap and electromagnet may be provided. A two blade, two electromagnet embodiment is described.

32 Claims, 5 Drawing Sheets

HIGH SPEED SHUTTER MECHANISM FOR A LIGHT BEAM

TECHNICAL FIELD

The present invention relates to shutter mechanisms for light beams, and in particular to shutters which are electromagnetically operated.

BACKGROUND ART

A typical shutter mechanism of the prior art includes an electromagnet comprising a ferrite core surrounded by a magnetic winding on a pancake bobbin and also includes a very thin elongated flexible foil steel strip attached by retaining screws at one end to a collar and lying parallel to and below a laser beam path when the electromagnet is inactive. In operation, the winding is energized, activating the magnet and causing the free end of the foil strip to be attracted to the magnet and bend upward into the beam path. As the end of the strip intercepts the beam path, the beam is reflected away from the path by a few degrees. The angle of reflection increases as the foil end approaches the magnet. In the fully closed position the strip conforms flat against the magnet and then bends sharply downward to the retaining screws, blocking the beam.

The foil strip is not only extremely flexible, but also has low mass, which aids in reducing vibration caused by the collision of the strip with the electromagnet. However, the strip is also very weak, particularly at stress points in the bend, and thereby has a lifetime of only about 100,000 cycles before breakage occurs. The strip reflects the beam at an angle near that of the unaltered beam path, creating an unwanted stray reflection line that must be trimmed off. The orientation of the strip in the fully closed position allows laser light to be scattered back into the laser, preventing its use in certain applications. Thermally, the thin foil is not capable of conducting away sufficient heat arising from absorption of high power laser light.

In U.S. Pat. No. 4,799,767, Woodruff describes a shutter mechanism having a stiff, but still flexible, ferromagnetic blade mounted in V-shaped relationship with the poles of an electromagnet. The electromagnet has a cylindrical core with a lengthwise, i.e. axial, slice defining poles, and has a toroidal winding around the core communicating with an electrical power supply. When the electromagnet is activated, the free end of the blade flexes toward the magnetic pole surfaces. In one embodiment, the light path passes between the magnetic poles, and the blade, normally parallel to the beam path, flexes downward to block the beam. The flexed blade and a light absorptive backup plate, against which the blade normally rests, combine to define a V-shaped light trap for the beam. In another embodiment, the blade normally lies at an angle in the lengthwise direction across the beam path and rests against a backup plate, covering an opening in the plate. A light absorptive tongue between the electromagnet's poles combines with the blade to form a light trap. When the blade flexes downward, the light passes through the opening in the backup plate. In both embodiments, the beam path is directed generally along the length of the blade.

An object of the present invention is to produce a laser beam shutter mechanism having long life and no stray reflection so as to be suitable for high speed pulse operation.

Another object of the present invention is to produce a shutter mechanism suitable for use with high power lasers and other beam sources.

DISCLOSURE OF THE INVENTION

The above objects are met with a beam shutter having a flat, relatively stiff yet flexible, ferromagnetic blade which is oriented with a lengthwise direction of the blade at approximately a right angle to the beam path and tilted up in the widthwise direction so as to be oriented at approximately a 45° angle with respect to the beam path. In other words, the beam is incident from the side relative to the blade. The blade is normally in a straight position but may be flexed into a flexed position by an electromagnet communicating with an electrical power supply. The blade is reflective and intersects the beam path in only one of the two positions. Thus in a normally closed shutter environment, the blade blocks and reflects the light downward when it is straight, but allows the beam to pass when it is flexed. In a normally open shutter embodiment, the blade allows the beam to pass when it is straight, but flexes downward to block and redirect the beam. The reflected light beam is typically collected by a V-shaped light trap.

The electromagnet preferably comprises an elongated core with a J-shaped cross-section with the J-arm and J-hook ends defining the magnetic poles. A wire winding is wrapped lengthwise about the core in the channel between the poles. The poles, like the blade, are slanted in the widthwise direction, i.e. from pole to pole, so that one pole is higher than the other. The poles lie substantially in a plane that is oriented in the widthwise direction at an approximately 45° angle relative to the beam path, and in the lengthwise direction in a V-shaped relationship to a straight blade. The poles have an arcuate surface profile that corresponds closely to the shape of the flexed blade. An elastomeric member may be disposed on each of the poles. Use of this electromagnet with the blade as oriented in the description above prolongs the life of the blade by eliminating extreme stress points and produces excellent magnetic coupling.

Typically, the blade and electromagnet are contained within a housing. The housing has at least one set of apertures in opposed sides for defining the beam path through the housing. For high power operation, heat may be dissipated by a thermally conductive return position blade stop that abuts the blade, when the blade is in its straight position. The stop may be cooled by a flow of coolant through channels within the stop. The light trap and electromagnet may also be cooled by a flow of coolant.

Two adjacent blades, which cooperate to block a light beam when the blades are straight, may be used. The two blades are flexible in opposite directions by a pair of electromagnets to allow the light beam to pass.

BEST MODE FOR CARRYING OUT THE INVENTION

Figure 1:
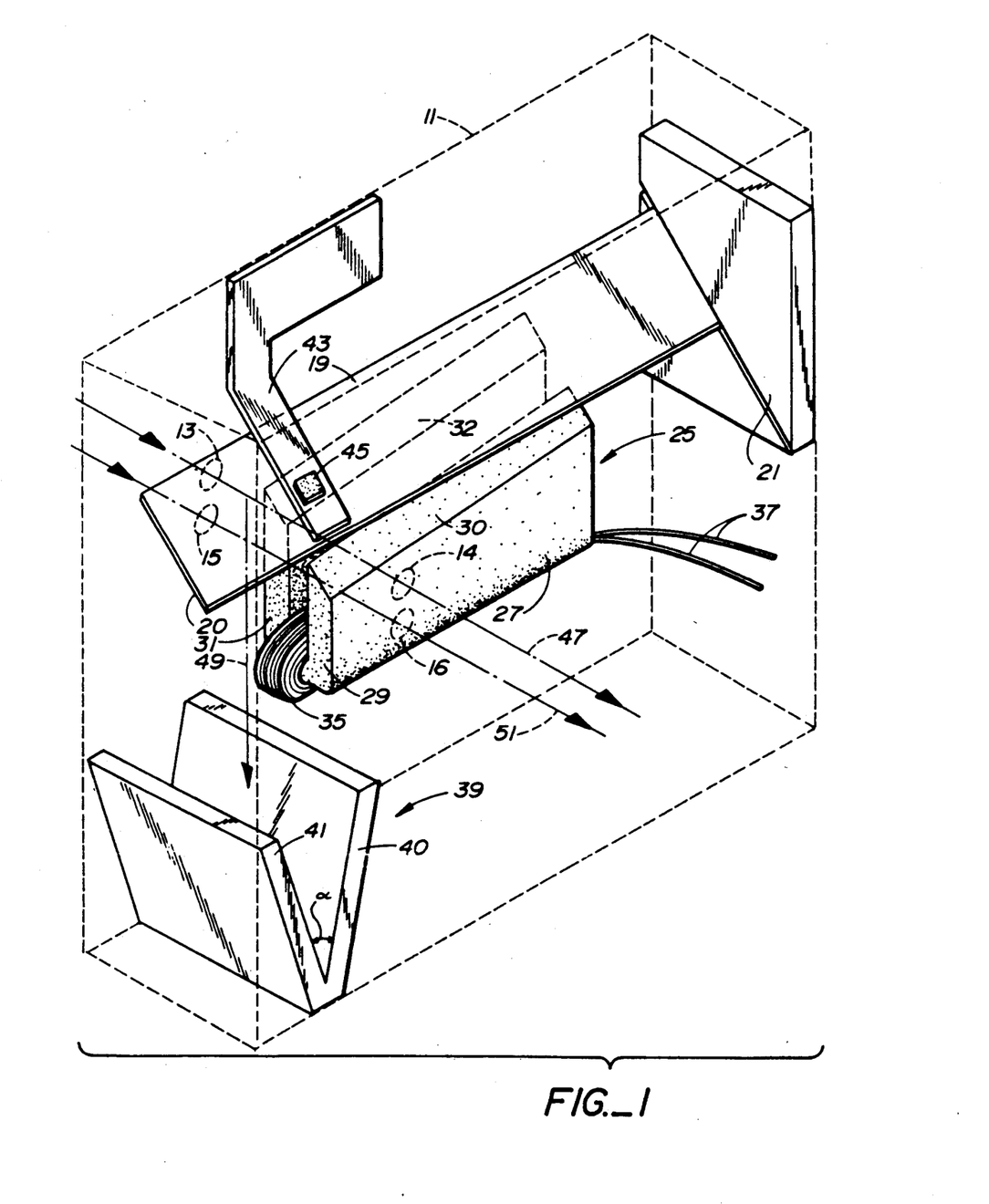
FIG. 1 is a perspective view of a beam shutter mechanism of the present invention with the housing or case, indicated in phantom, removed for clarity.
Figure 2:
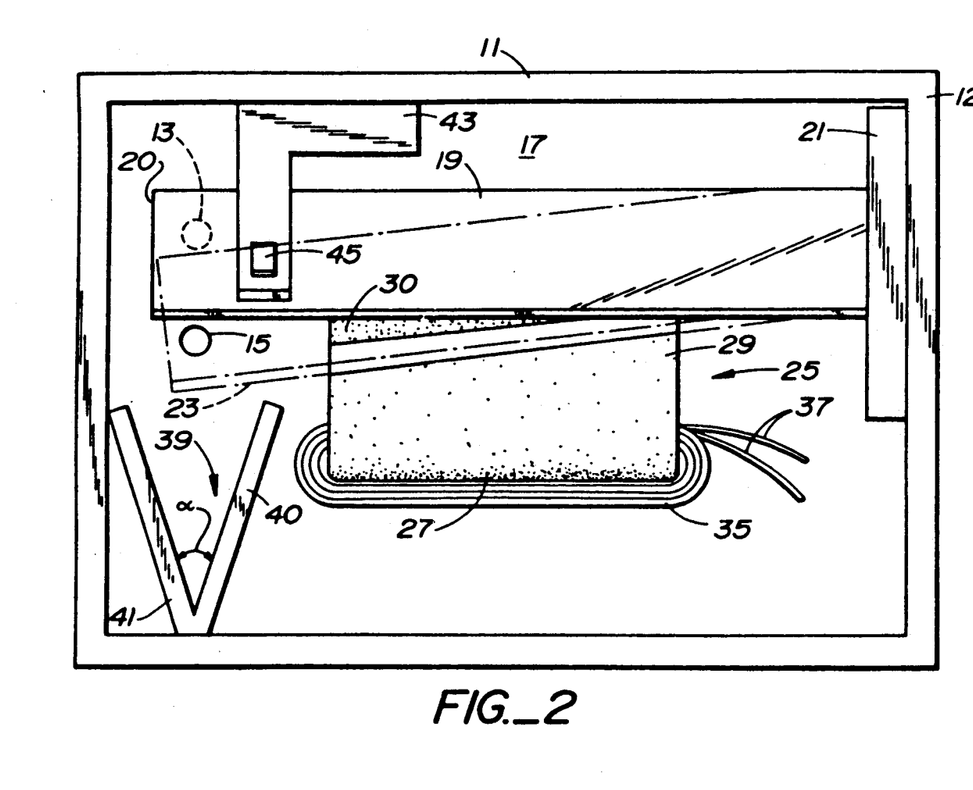
FIG. 2 is a side elevational view of the beam shutter in FIG. 1 with only one side of the housing removed. A flexed position of the blade is seen in phantom.
Figure 3:
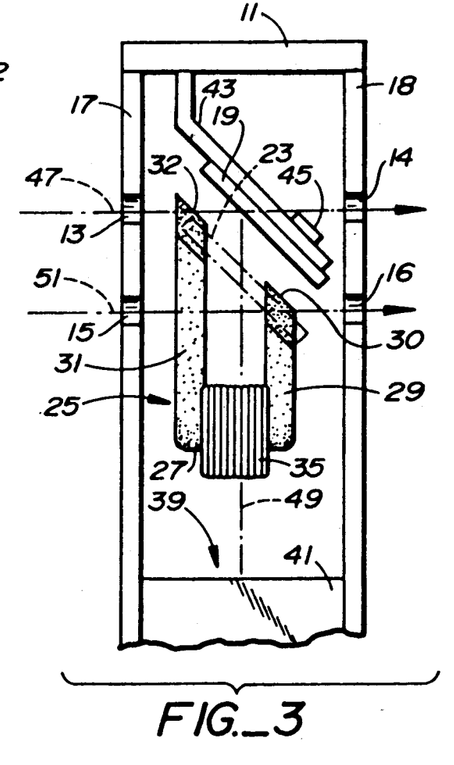
FIG. 3 is a partial end view of the beam shutter in FIGS. 1 and 2.

With reference to FIGS. 1-3, an embodiment of a beam shutter mechanism of the present invention includes a housing or case 11 made up of a frame 12 and two flat plates 17 and 18 disposed, respectively, on opposed left and right sides of the frame. The side plates 17 and 18 of the housing 11 have apertures or openings 13-16 defined therein. One set of apertures 13 and 14 defines a first path for a light beam 47 through the housing. The housing 11 may also include a second set of apertures 15 and 16 for defining a second path for a light beam 51 through the housing.

The shutter also includes a flat elongated ferromagnetic blade 19 mounted in a slotted member or clamp 21 to the frame 12 at one end of housing 11. At the other end 20 from slotted mount 21, blade 19 is free, that is, not mounted or secured, so as to be able to bend or flex in response to a magnetic field. The blade 19 is oriented generally lengthwise from end to end of the housing 11, such that a lengthwise direction of the blade 19 from slotted mount 21 to free end 20 is at approximately a right angle to the beam paths 47 and 51 through apertures 13-16 in the housing 11. A 15° variation from a perfect right angle of 90° is acceptable, so that "approximately" in this case refers to a range of 75°-105° with respect to the beam paths 47 and 51. The blade 19 is also oriented diagonally so that one side edge of blade 19 is higher than the other. As seen especially in FIG. 3, a widthwise direction of the blade 19 is at approximately a 45° angle, i.e. in a range of 30°-60°, with respect to the beam paths 47 and 51.

Blade 19 is relatively stiff, yet thin enough to be flexible as well. Blade 19 is normally straight, as shown in FIGS. 1-3, but can be flexed into a flexed position 23, shown in phantom in FIGS. 2 and 3. Blade 19 flexes normal to its major surfaces rather than torsionally. In one of the straight and flexed positions, blade 19 intercepts a given beam path 47 and 51 through housing 11, while in the other position it allows light on that path 47 or 51 to pass unimpeded through the housing 11. For example, in the illustrated embodiment, the straight position of blade 19 intercepts beam path 47 and lets light in path 51 go through the housing unimpeded, while the flexed position 23 intercepts beam path 51 and lets light in path 47 pass. The housing 11 can have either or both sets of apertures 13-16 and either or both beam path 47 and 51. In a housing with two beam paths 47 and 51, either one or both of the paths may be in actual use, that is, have a light beam present on it.

Blade 19 is highly reflective of light, preferably including near infrared and near ultraviolet light as well as visible light, and typically has a reflectivity greater than 95°. Blade 19 may be polished and coated with a metallic or dielectric reflective coating to further enhance its reflectivity for high power applications. When blade 19 intercepts a light beam it blocks the light from its usual path through the housing 11 and redirects it downward toward a light trap 39. For example, in FIGS. 1 and 3, a light beam incident on path 47 is reflected onto a new light path 49 into the light trap 39. Light trap 39 is typically a narrow V-shaped element connected to frame 12 with absorptive side walls 40 and 41. An angle between walls 40 and 41 of less than 30° is preferred.

Figures 9, 10:
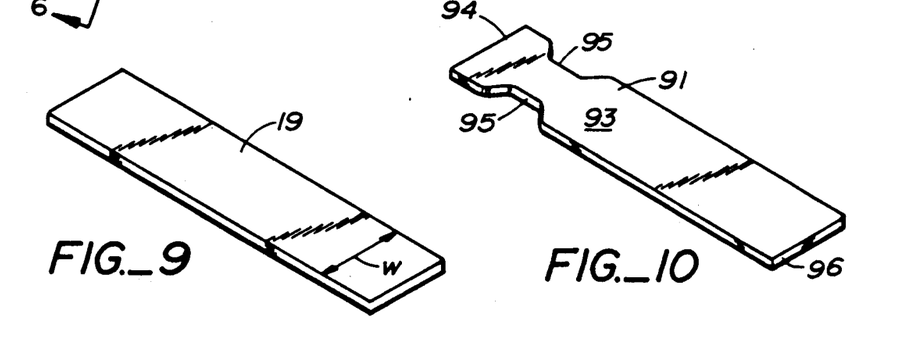
FIGS. 9 and 10 are perspective views of two alternative blade constructions for use with the present invention.

As seen in FIGS. 9 and 10, the blade 19 may be a balanced flat rectangular shape with a constant width W. Alternatively, as illustrated in FIG. 10, a blade 91 may be used which has a narrow necked down area 93 formed by cutouts 95 near mounted end 94. This later structure 91 reduces the mechanical force needed for flexing the blade, while maintaining a large area in the magnetic and optical areas of the blade. The necked down area 93 would be located near the slotted mount 21. The end right hand 96 in FIG. 10, furthest from necked down area 93, is the free end.

Referring again to FIGS. 1-3, the beam shutter also includes an electromagnet 25 for flexing the blade 19. Electromagnet 25 comprises a core 27 wrapped with wire winding 35. The core material is a magnetic grade material, such as iron, with high permeability, providing low hysteresis loss and high efficiency. Core 27 is an elongated piece with a J-shaped cross-section. The J-arm and J-hook form respective sides 31 and 29 of the core, and the J-arm and J-hook ends define respective magnetic poles 32 and 30. The channel between sides 31 and 29 accommodates the wire winding 35 which is wrapped lengthwise about the core. Like diagonal slant of the blade 19, the J-shape of the magnetic core 27 provides that one pole 32 is higher than the other pole 30, with the poles 30 and 32 lying substantially in a plane that has its widthwise direction (from pole-to-pole) at approximately a 45° angle with respect to the beam paths 47 and 51. Preferably, this angle is substantially the same as the widthwise orientation angle of the blade 19. The core shape could also be described as essentially cylindrical with a lengthwise slice taken out along the diagonal plane defining poles 30 and 32.

The electromagnet 25 and blade 19 are oriented with respect to one another so that electromagnet 25 is able to flex the blade 19 downward toward its poles 30 and 32. Thus, the plane in which the poles 30 and 32 substantially lie is oriented in a lengthwise direction in V-shaped relationship with the straight position of blade 19. A typical angle between blade 19, when straight, and poles 30 and 32 is about 5°-15°. Wire winding 35 communicates with an electric power supply via leads 37 for activating the electromagnet 25. Drive electronics, not part of this invention, control the duty cycle and frequency of the electric power supplied to the electromagnet. Typically, a high voltage pulse of short duration is sent to the electromagnet 25 to move the blade 19 into the flexed position 23, followed by a sustained lower voltage to hold the blade 19 against the magnetic poles 30 and 32. Poles 30 and 32 have an arcuate or catenary surface profile that corresponds closely to the natural cantilever spring contour the blade 19 assumes when it is flexed. An elastomeric member, typically in the form of an elastomer material thin film, may be disposed on each of the magnetic poles 30 and 32 to reduce blade vibration.

The beam shutter also includes a number of elements for cooling the blade 19, light trap 39 and electromagnet 25 for high power applications. In FIGS. 1-3, a return position blade stop 43 is mounted to the top of frame 12 of housing 11. Blade stop 43 abuts blade 19 when the blade 19 is in its straight position. A magnet 45 on blade stop 43 thermally mates the blade 19 firmly against the stop. Magnet 45 is weaker than the electromagnet 25, so that when the latter is active it can overpower and pull down the blade 19. Blade stop 43 is thermally conductive, such as metallic, so as to conduct heat from the end of the blade to the housing 11. Housing frame 12 is typically aluminum for high heat conductivity. For low power applications, stop 43 may be elastomeric to reduce blade vibration. Blade stop 43 does not obstruct the beam paths 47 or 51.

Figure 4:
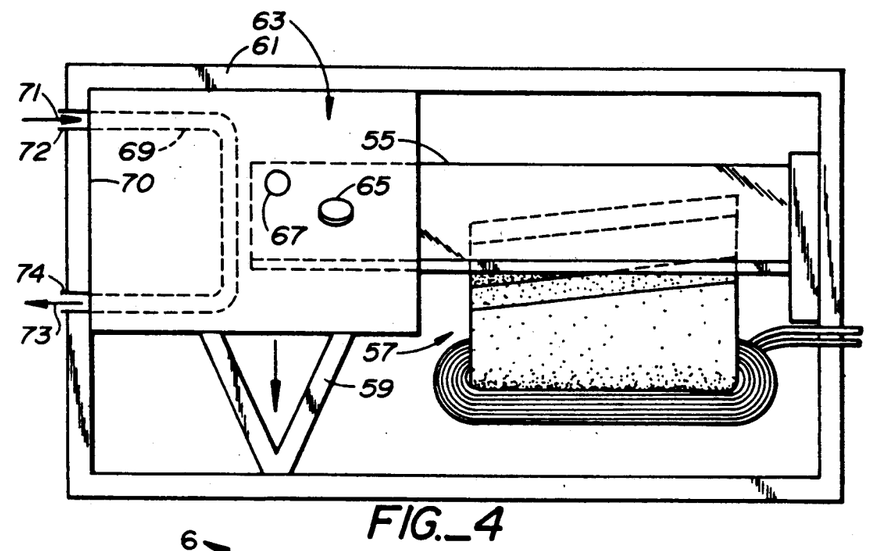
FIG. 4 is a side elevational view of an alternative beam shutter embodiment with flow cooling of the blade stop.

In FIG. 4, an alternative shutter embodiment includes a blade 55, electromagnet 57 and light trap 59 contained in a housing or case 61 as previously described for FIGS. 1-3. This embodiment, however, makes use of an active water-cooled blade stop 63 instead of the passively cooled stop 43 of FIGS. 1-3. Blade stop 63 is again mounted to the frame of housing 61 and abuts blade 55 when the blade is in its straight position. Again, a weak magnet 65 may firmly mate the blade 55 against the stop 63 for more efficient heat removal. An aperture 67 is provided in the blade stop 63 so as not to obstruct the beam path through the housing. Blade stop 63 includes a channel 69 formed therein with openings 72 and 74 in a stop edge 70 aligned with like openings in the housing 61. Channel 69 may be formed by etching or machining them into the surface of a first blade stop piece and then covering the channel-formed piece with a water tight cover piece. A coolant, such as water, flows in at opening 72 through channels 69, picking up heat from blade 55, then flows out through opening 74, as indicated by arrows 71 and 73.

Figure 5:
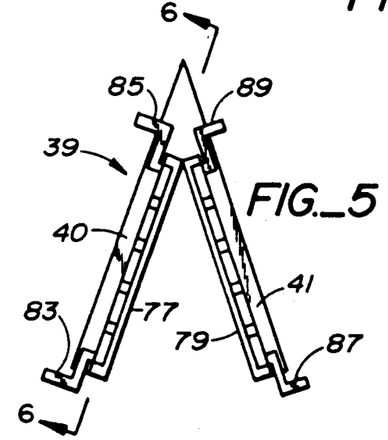
FIG. 5 is a side view of a light trap for use in the beam shutters of the present invention.
Figure 6:
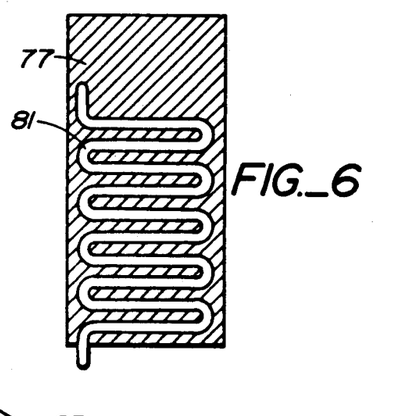
FIG. 6 is a sectional view of one side wall of the light trap, taken along the line 6—6 in FIG. 5.

Referring to FIGS. 5 and 6, the light trap 39 or 59 of any of the shutter embodiments may also be cooled actively with a coolant flow. As described above, the light trap 39 is V-shaped with upright angled side walls 40 and 41 that are light absorptive. Here side walls 40 and 41 are multipiece elements. One piece 77 of side wall 40 has a channel 81 etched or machined into one of its major surfaces or, alternatively, has tubing affixed thereat. This piece 77 is then affixed to the base portion of side wall 40. Side wall 41 is similarly constructed with a channel piece 79. Side walls 40 and 41 accept tubular inlets and outlets 83, 85, 87 and 89 for the passage of a coolant, such as water, into and out of channels or tubes 81.

Figure 7:
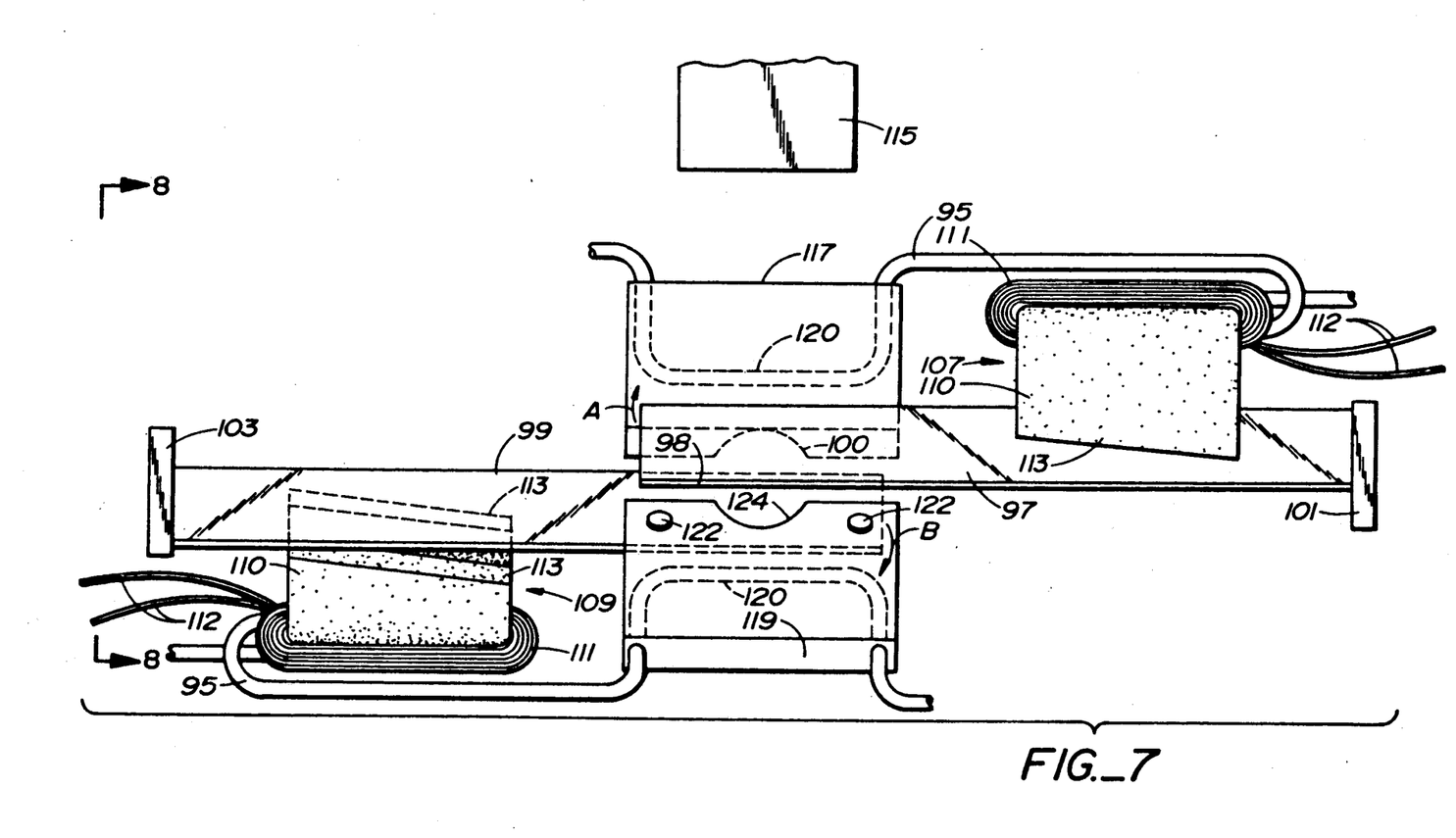
FIGS. 7 and 8 are respective side and end elevational views of a third beam shutter embodiment of the present invention with two blades.

With reference to FIG. 7, another cooling structure is a tubing 95 wrapped around the electromagnet's wire winding 111. Tubing 95 contains a flow of coolant for removing heat from electromagnets 107 and 109. Tubing 95 may be the same tubing that connects to inlets and outlets of channels 120 in water-cooled blade stops 117 and 119.

Figure 8:
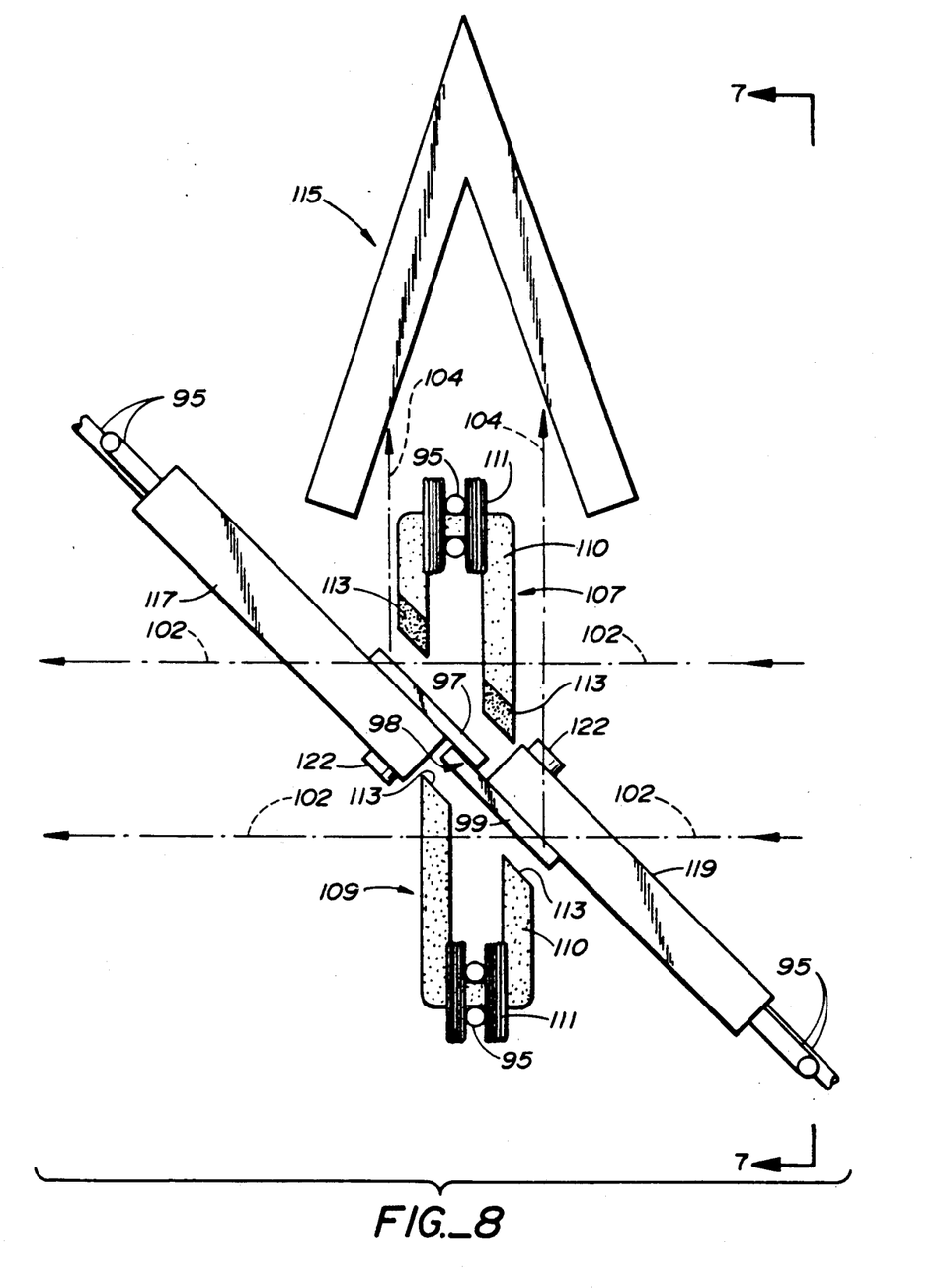

In FIGS. 7 and 8, another embodiment of a beam shutter mechanism of the present invention comprises a pair of flat flexible ferromagnetic blades 97 and 99. Both of the blades 97 and 99 are oriented as in FIGS. 1-3 with a lengthwise direction approximately at a right angle (i.e., 75° to 105°) with respect to the path of the light beam 102 through apertures 100 and with a widthwise direction oriented at approximately a 45° angle (i.e., 30° to 60°) with respect to the light path. Each of the blades 97 and 99 is mounted at a far end by slotted clamps 101 and 103 and has a free end that intersects the beam path 102 when the blades are straight. Each of the blades 97 and 99 are normally in a straight position but are flexible into a flexed position against respective electromagnets 107 and 109. Each of the blades 97 and 99 individually intersects the beam path 102 only partially when in a straight position, but the pair of blades 97 and 99 together intersect the entire beam path 102 when both blades are in their straight positions. Preferably, the blades 97 and 99 overlap slightly at their edges, as indicated by area 98 in FIG. 8, to ensure complete beam blockage. The gap 98 should be large enough that the two blades 97 and 99 do not collide when returning to the rest position. A light beam on path 102 is then redirected onto a new light path 104 toward light trap 115, since blades 97 and 99 are highly reflective.

The beam shutter mechanism of FIGS. 7 and 8 also comprise a pair of electromagnets 107 and 109. Like the electromagnet 25 in FIGS. 1-3, electromagnets 107 and 109 each have an elongated core 110 with a J-shaped cross-section, the J-arm and J-hook ends defining magnetic poles 113 with a channel therebetween. The channel accommodates a wire winding 111 wrapped lengthwise about the core 110 and communicating via leads 112 with an electrical power supply for activating the electromagnets 107 and 109. As previously described for electromagnet 25 in FIGS. 1-3, each electromagnet 107 and 109 in FIGS. 7 and 8 is oriented such that its poles 113 lie substantially in a plane with its widthwise direction from pole-to-pole at approximately a 45° angle to the beam path 102 and with its lengthwise direction in V-shaped relation to the blades 97 and 99 when straight. The electromagnets 107 and 109 when activated flex their respective corresponding blades 97 and 99 toward their poles 113. In other words, the blades 97 and 99 flex apart in opposite directions, opening the beam path 102 to unimpeded light passage. The poles 113 have an arcuate or catenary surface profile that corresponds closely to the shape the blades 97 and 99 assume when they are flexed. An elastomeric member, typically in the form of an elastomer material thin film, may be disposed on each of the poles 113.

An alternative but equivalent arrangement to the two blade configuration shown in FIGS. 7 and 8, has the pair of blades normally spaced apart from one another in their straight positions, but flexible toward one another into flexed positions that slightly overlap at the blade edges. Thus, the two blades individually would only partially block the beam path, but together would entirely block the beam path, when both blades are in their flexed positions. When the blades are straight, the beam path is clear and a beam is allowed to pass unimpeded. The electromagnets 107 and 109 in FIGS. 7 and 8 are reversed and the beam stops 117 and 119 are moved to the opposite sides of the blades 97 and 99 so that the electromagnets can flex the blades together when activated.

For cooling of the blade, a thermally conductive return position blade stop 117 and 119 for each blade 97 and 99 respectively is mounted to abut against their associated blades when they are straight. One or more weak electromagnets 122 may be provided to firmly hold the blades 97 and 99 against the stops 117 and 119. As in the embodiment in FIG. 4, the blade stops 117 and 119 may each have a channel 120 formed therein for the passage of a flow of coolant. Coolant may be provided through the same tubing 95 used for cooling the electromagnets 107 and 109. A cutout 124 may be provided in the edge of each blade stop 117 and 119 to provide an aperture for the light beam path 102 when the blades are flexed. The light trap 115 may also be coolant cooled as in FIGS. 5 and 6.

The embodiment in FIGS. 7 and 8 can accommodate a larger light beam than that in FIGS. 1-3 for the same size blades, and therefore does not lose the switching speed that could come from using a single larger, heavier and stiffer blade. Further, for the same size light beam, the embodiment in FIGS. 7 and 8 requires only half as much flexing from each blade 97 and 99, compared to the blade 19 in FIGS. 1-3, to completely open up the light path. Thus it can operate at a faster switching speed than the embodiment in FIGS. 1-3. The embodiment in FIGS. 1-3 is thinner than prior devices that use a lengthwise directed beam.

I claim:

1. A shutter mechanism for shuttering a light beam traveling along a path from a source comprising,
   a flat, flexible, ferromagnetic blade oriented with a lengthwise direction of said blade at approximately a right angle with respect to the path of the light beam and a widthwise direction of said blade at an angle in a range from 30° to 60° with respect to the path of the light beam, said blade being normally in a straight position but being flexible into a flexed position, said blade being reflective and intersecting the path of the light beam when in only one of said straight and flexed positions, and
   an electromagnet communicating with an electrical power supply and mounted in a position relative to said blade so as to be able to flex said blade into said flexed position when said electromagnet is active.

2. The shutter mechanism of claim 1 wherein said electromagnet comprises an elongated core with a J-shaped cross-section and a wire winding lengthwise about said core, J-arm and J-hook ends of said core defining magnetic poles, said poles lying substantially in a plane that is oriented with a widthwise direction at an angle in a range from 30° to 60° with respect to the path of the light beam and a lengthwise direction in V-shaped relationship to said blade in said straight position, said poles having an arcuate surface profile corresponding closely to the shape of said blade in said flexed position.

3. The shutter mechanism of claim 2 wherein an elastomeric member is disposed on each of said poles.

4. The shutter mechanism of claim 1 further comprising means for absorbing light reflected by said blade.

5. The shutter mechanism of claim 4 wherein said means for absorbing comprises a narrow V-shaped light trap with absorptive sides, disposed below said blade to collect light reflected downward at approximately a right angle by said blade.

6. The shutter mechanism of claim 5 wherein said light trap has means for removing heat therefrom.

7. The shutter mechanism of claim 1 further comprising thermally conductive means for dissipating heat from said blade.

8. The shutter mechanism of claim 7 wherein said thermally conductive means comprises a blade stop abutting against said blade when said blade is in said straight position.

9. The shutter mechanism of claim 8 wherein said blade stop has a flow channel therein for carrying a coolant.

10. The shutter mechanism of claim 1 wherein said blade and said electromagnet are mounted within a housing, said housing having a set of apertures defined in opposed sides thereof, said apertures defining said path of said light beam through said housing.

11. The shutter mechanism of claim 10 wherein said housing has a second set of apertures defined in said opposed sides, said second set of apertures defining a second path for a light beam through said housing, said blade blocking one light path through said housing when in said straight position and the other light path when in said flexed position.

12. The shutter mechanism of claim 1 further comprising a second blade and a second electromagnet substantially identical to the first blade and electromagnet, said second blade oriented with a widthwise direction thereof at an approximately 45° angle with respect to the path of the light beam, each of the two blades individually intersecting the path of the light beam only partially when in a straight position, said second blade partially overlapping an edge of the first blade, the two blades together intersecting the path of the light beam entirely when both blades are in a straight position, the two electromagnets mounted relative to their respective blades so as to be able when active to flex the blades in opposite directions into a flexed position, whereby the path of the light beam is unimpeded.

13. A shutter mechanism for shuttering a light beam traveling along a path from a source comprising,
   a housing having a set of apertures in opposed sides thereof so as to define a first beam path therethrough,
   a flat, flexible, ferromagnetic blade mounted in said housing at one end, said blade being oriented in a lengthwise direction from end to end of said housing such that said first beam path is at approximately a right angle to a length of said blade, said blade also being oriented at a diagonal such that said first beam path is at an angle in a range from 30° to 60° with respect to a width of the blade, said blade being normally in a straight position and being flexible into a flexed position, said blade being reflective and intersecting said first beam path through said sides of said housing when in only one of said straight and flexed positions,
   an electromagnet having an elongated core with a J-shaped cross-section, J-arm and J-hook ends of said core defining magnetic poles with a channel therebetween accommodating a wire winding wrapped lengthwise about said core, said wire communicating with an electrical power supply for activating said electromagnet, said electromagnet being mounted such that said poles lie substantially in a plane that is oriented with its widthwise direction at substantially the same angle with respect to said first beam path as said blade and with its lengthwise direction in V-shaped relationship to said straight position of said blade, whereby said electromagnet is disposed so as to be able when active to flex said blade into said flexed position, said poles having an arcuate surface profile corresponding closely to the shape of said blade in said flexed position, and
   means for absorbing light reflected by said blade.

14. The shutter mechanism of claim 13 wherein said means for absorbing comprises a narrow V-shaped light trap with absorptive sides disposed below said blade to collect light reflected downward from said first beam path at approximately a right angle by said blade.

15. The shutter mechanism of claim 14 wherein said light trap has means in said absorptive sides for removing heat therefrom.

16. The shutter mechanism of claim 13 wherein an elastomeric member is disposed on each of said poles.

17. The shutter mechanism of claim 13 further comprising thermally conductive means for dissipating heat from said blade.

18. The shutter mechanism of claim 17 wherein said thermally conductive means comprises a blade stop abutting against said blade when said blade is in said straight position.

19. The shutter mechanism of claim 18 wherein said blade stop has a flow channel therein for carrying a coolant.

20. The shutter mechanism of claim 18 wherein said blade stop includes a magnet weaker than said electromagnet for securing said blade to said stop when said electromagnet is inactive.

21. The shutter mechanism of claim 13 wherein said housing further includes a second set of apertures in said opposed sides thereof so as to define a second beam path therethrough, said blade intersecting the first beam path through said housing in one of said straight and flexed positions and intersecting the second beam path through said housing in the other of said straight and flexed positions.

22. A shutter mechanism for shuttering a light beam traveling along a path from a source comprising,
a pair of flexible ferromagnetic blades, both of said blades being oriented with a lengthwise direction approximately at a right angle with respect to the path of the light beam and with a widthwise direction at an angle in a range from 30° to 60° with respect to the path of the light beam, each of the blades being normally in a straight position but being flexible into a flexed position, each of the blades being reflective, each of the blades individually intersecting the path of the light beam only partially when in said straight position, the pair of blades together intersecting the path of the light beam entirely when both blades are in said straight position,
a pair of electromagnets, each electromagnet having an elongated core with a J-shaped cross-section, J-arm and J-hook ends of each core defining magnetic poles with a channel therebetween, the channel of each core accommodating a winding wrapped lengthwise thereabout, each wire winding communicating with an electrical power supply for activating its electromagnet, the pair of electromagnets being mounted on opposite sides of the centrally located pair of blades such that the poles of each electromagnet lie substantially in planes oriented with their corresponding widthwise directions at an angle in a range from 30° to 60° with respect to the path of the beam and with corresponding lengthwise directions in V-shaped relationship with the straight position of a corresponding one of said blades, whereby the electromagnets are disposed to be able when activated to flex said pair of blades apart in opposite directions into said flexed positions, said poles having an arcuate surface profile corresponding closely to the shapes of said blades in said flexed positions, and
means for absorbing light reflected by said pair of blades.

23. The shutter mechanism of claim 22 wherein said means for absorbing comprises a narrow V-shaped light trap with absorptive sides disposed at approximately a right angle to the path of the light beam to collect the light reflected from both blades.

24. The shutter mechanism of claim 23 wherein said light trap has means for removing heat therefrom.

25. The shutter mechanism of claim 22 wherein an elastomeric member is disposed on each of said poles of each electromagnet.

26. The shutter mechanism of claim 22 further comprising thermally conductive means for dissipating heat from said pair of blades.

27. The shutter mechanism of claim 26 wherein said thermally conductive means comprises a pair of blade stops, each abutting against one of said pair of blades when said blades are in said straight positions.

28. The shutter mechanism of claim 27 wherein each blade stop has a flow channel therein for carrying a coolant.

29. The shutter mechanism of claim 27 wherein each blade stop includes a magnet weaker than said electromagnets when securing said blades to the blade stops when the electromagnets are inactive.

30. The shutter mechanism of claim 22 further comprising means for removing heat from said electromagnets.

31. The shutter mechanism of claim 30 wherein said means for removing heat comprises a pair of tubes wrapped lengthwise about said wire winding of each electromagnet and coolant flowing through each tube.

32. A shutter mechanism for shuttering a light beam traveling along a path from a source comprising,
a pair of flexible ferromagnetic blades, both of said blades being oriented with a lengthwise direction approximately at a right angle with respect to the path of the light beam and with a widthwise direction at an angle in a range from 30° to 60° with respect to the path of the light beam, each of the blades being normally in a straight position spaced apart from the other blade but being flexible into a flexed position overlapping the other blade, each of the blades being reflective, each of the blades individually intersecting the path of the light beam partially when in said flexed position, the pair of blades together intersecting the path of the light beam entirely when both blades are in said flexed position,
a pair of electromagnets, each electromagnet having an elongated core with a J-shaped cross-section, J-arm and J-hook ends of each core defining magnetic poles with a channel therebetween, the channel of each core accommodating a winding wrapped lengthwise thereabout, each wire winding communicating with an electrical power supply for activating its electromagnet, the pair of electromagnets being mounted on opposite sides of the centrally located pair of blades such that the poles of each electromagnet lie substantially in planes oriented with their corresponding widthwise directions at an angle in a range from 30° to 60° with respect to the path of the beam and with corresponding lengthwise directions in V-shaped relationship with the straight position of a corresponding one of said blades, whereby the electromagnets are disposed to be able when activated to flex said pair of blades together in opposite directions into said flexed positions, said poles having an arcuate surface profile corresponding closely to the shapes of said blades in said flexed positions, and
means for absorbing light reflected by said pair of blades.

* * * * *